Feb. 7, 1933.  H. C. BOSTWICK  1,896,214
ADJUSTABLE TIRE CORE
Filed Aug. 20, 1931
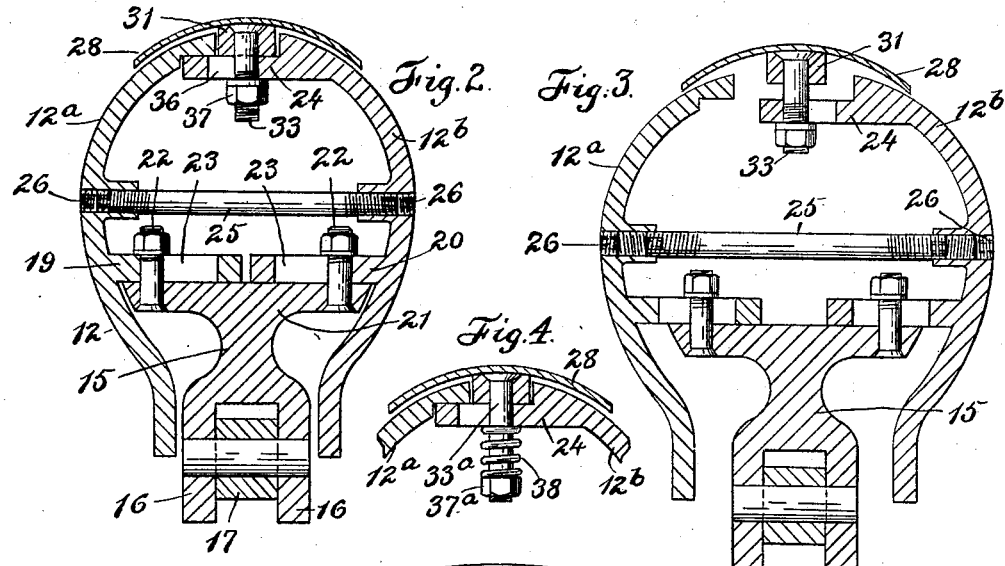
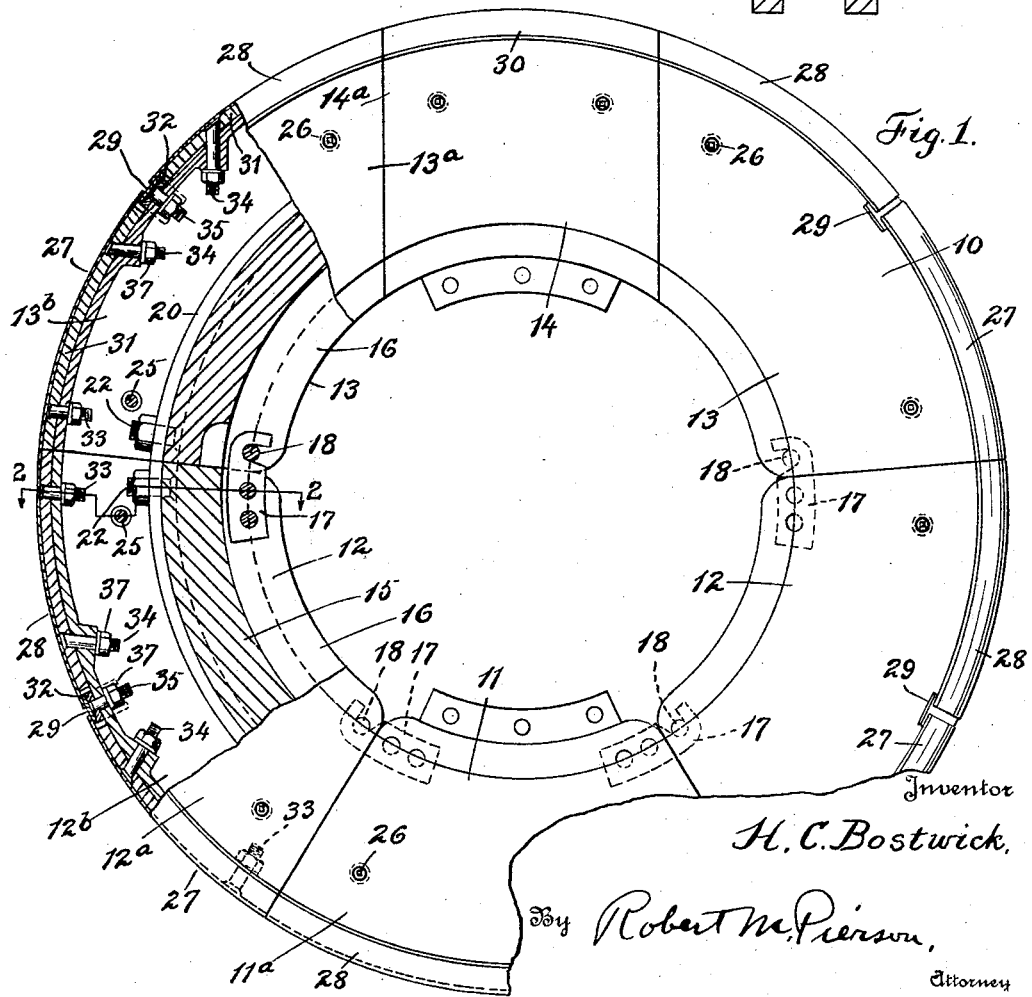

Patented Feb. 7, 1933

1,896,214

UNITED STATES PATENT OFFICE

HENRY C. BOSTWICK, OF AKRON, OHIO, ASSIGNOR TO THE AKRON STANDARD MOLD COMPANY, OF AKRON, OHIO, A CORPORATION OF OHIO

ADJUSTABLE TIRE CORE

Application filed August 20, 1931. Serial No. 558,233.

This invention relates to cores for building pneumatic tire casings, and it has for its object to provide certain improvements in a core of adjustable dimensions for making tires of different sizes.

The invention is directed more particularly to a means for varying the length of the core at its outer or tread circumference, especially when said core is also made adjustable in width, to the end that the cross-sectional diameter may be varied both laterally and radially.

Of the accompanying drawing, Fig. 1 is a side elevation, partly broken away and in section, illustrating a segmental collapsible tire-building core embodying my invention in a preferred form.

Fig. 2 is a cross section on the line 2—2 of Fig. 1, showing the core adjusted to its narrowest width.

Fig. 3 is a view similar to Fig. 2, showing the core widened out.

Fig. 4 is a detail cross section illustrating a modification.

Cores for building tire casings with inextensible beads are made collapsible, and in the drawing I have shown my invention applied to such a core comprising a series of five body segments pivotally and detachably coupled together in a particular manner, and a slidable key segment, but it will be understood that the general body construction and mode of mounting and uniting the segments may be widely varied.

10 denotes generally a toric core body composed of a base segment 11 adapted to be permanently mounted on a rotary chuck, a pair of adjoining intermediate segments 12, a second pair of intermediate segments 13 and a key segment 14 slidable radially between the ends of the latter pair opposite to the base segment and adapted to be connected with operating mechanism on the chuck. The division planes between the segments 11, 12 and 13 are radial and those between the segments 13 and 14 are substantially parallel and semi-radial.

The core body construction includes a segmental, inner tongue ring designated generally at 15 and formed with a pair of radial flanges 16 separated by an inwardly-open groove in which are located coupling hooks 17—two on the base segment 11 and one on each of the segments 12—for connecting them to the adjoining segments. Said hooks have their shanks riveted to the ring flanges 16 and their projecting ends provided with inwardly-open recesses for engaging with pins 18 on the neighboring segments, whereby the several body segments 11, 12 and 13 are detachably and pivotally coupled together, the corners of the segments being rounded to permit the pivotal movement.

The core body is longitudinally divided in the central plane thereof into a pair of segmental side sections the members of which are respectively distinguished with the exponents $a$ and $b$, those for the segment 12 being designated $12^a$ and $12^b$ and so on. The respective side members in each segment are formed with internal flanges 19 and 20 supported on a cylindrical peripheral portion 21 of the tongue-ring 15 and secured to said portion by means of stud bolts 22 arranged in two pairs near the two ends of each body segment and their stems occupying transverse slots 23 in the flanges whereby said side members may be fixed on the tongue ring at different width adjustments. The side members $12^a$ and $12^b$ are also telescopically interfitted at their outer periphery in the narrower adjustments of the core by means of a lateral inwardly-projecting flange 24 on the member $12^b$ underlying a complemental marginal portion of member $12^a$.

I have further shown a series of transverse adjusting rods 25—two for each core segment—provided with right and left threads at their ends and screwing in complementally-threaded apertures in the side members, normally closed by screw plugs 26, the screw rods and plugs being formed with squared sockets in their ends to receive a turning tool. These rods provide a means for accurately adjusting the side members toward and from each other when the bolts 22 are loosened, but they are not broadly essential to the invention.

It will be observed that a core body constructed as described is laterally adjustable for building tire casings of the same bead diameter and the same or a different nominal tread diameter, and of different cross-sectional widths. When the core width is changed, it is desirable also to alter the circumferential length of the tread portion or crown of the core to a greater or less dimension as the case may be, in order to preserve the same general cross-sectional contour and thus to avoid a substantial variation in the thread angles of the cord plies in the tread portion of the tire carcass. This variation in tread circumference is accomplished, in accordance with my invention, in the manner now to be described.

On each of the several body segments 11, 12 and 13 are provided a plurality of tread segments or plates preferably mounted at their adjoining ends in overlapping relation. The number of these plates may be more or less, but I prefer to employ three plates 27, 28 and 29 for each of said body segments, the middle plate 29 being of relatively short circumferential length as compared with the longer end plates 27 and 28 and underlapping the adjoining ends of said end plates at all adjustments. For the key segments 14, a single tread plate 30 will suffice in view of the fact that the end faces of said key segment are substantially parallel, whereas those of the other segments are arranged in diverging planes.

These tread plates are made trough-shaped, being both longitudinally and transversely arcuate to conform with the outer periphery of the core body in the narrowest adjustment of the latter, as seen in Figs. 1 and 2. They are preferably made of sheet metal and each is welded at the middle zone thereof to an inner longitudinal stiffening rib designated as 31 for the two longer plates 27 and 28, and 32 for the short plate 29.

In this rib are fastened the stems of a pair of inwardly-projecting stud bolts 33, 34 for each of the longer plates 27 and 28, and a similar single bolt 35 for the short plate 29, the bolt stems extending through transverse slots 36 formed in the flange 24 on side member 12$^b$, for example, and provided with nuts 37 whereby said bolts and plates may be positively secured to the core body at different radial adjustments and at different lateral adjustments on the side members 12$^b$ etc. to maintain them in the middle of the tread. The two bolts 33 and 34 for each of the plates 27 and 28 are positioned substantially parallel with the nearest end face of the corresponding core segment, so that when said plates are radially adjusted their outer ends will move substantially in the plane of said end face. It will be understood that the securing bolts (not shown) for the key-segment plate 30 are similarly placed. The inner or adjoining ends of the plates 27, 28 of course move in a semi-radial direction, but the term "radial" is used in this connection to include both movements. The corresponding movement of the short plate 29 is substantially radial.

The core adjustments in this invention are made when the key segment 14 has been withdrawn and the intermediate segments 12 and 13 have been disconnected from each other and from the base segment 11, the nuts of the several bolts 22, 33, 34 and 35 being then accessible to a wrench inserted through either end of the hollow segment. The said bolts having been loosened, the side members, such as 12$^a$ and 12$^b$, are moved apart or together, as the case may be, to effect the width adjustment, and the tread plates 27, 28 and 29 (or 30 for the key segment) are or may be coordinately adjusted radially of the segment by the operation of adjusting its width, the rounded contour of the side members acting against the edges of the tread plates to vary the radial positions of the latter, as will be evident on comparing Figs. 2 and 3. When the new adjustment is attained, the nuts of the securing bolts are again set up and the parts locked together in the desired relative position. The transverse continuity of the tread surface is approximately preserved at all adjustments by the substantial meeting of the side edges of the tread plates with the side members of the core body, and the circumferential continuity is also approximately preserved by the substantial meeting or abutting of the ends of the tread plates at the division planes between the segments and by the overlapping of the tread plates 27, 28 and 29 at their adjacent ends.

Instead of a positive connection of the tread plates with the core body segments, I may provide a yielding connection as shown in the modification represented in Fig. 4 in which each of the securing bolts, such as 33$^a$, attached to the plates such as 28, is surrounded with a helical compression spring 38 interposed between the flange 24 and the nut 37$^a$ on said bolt. No setting up of the bolt nut is then required, but the tread plate will move in or out when the side members 12$^a$ 12$^b$ are relatively adjusted, to provide a tread adjustment corresponding with the change in width.

It will be understood that various other modifications could be made without departing from the scope of my invention as defined in the claims.

I claim:

1. A tire-building core having adjustable means for varying the length of its normal tread circumference for building tires of different sizes.

2. A tire-building core having means for adjusting the width of its cross section and for coordinately adjusting the length of its tread circumference.

3. A tire-building core longitudinally divided into sections and having means for fixing said sections at different width adjustments, and a series of tread segments combined with said sections and adjustable to correspondingly vary the tread diameter of the core.

4. A collapsible tire-building core transversely divided into segments each of which is longitudinally divided into sections, means for relatively fixing said sections at different width adjustments, and a series of tread segments radially adjustable on the core segments for increasing and diminishing the tread diameter of the core as its width is increased or diminished.

5. A tire-building core comprising a core body, and a series of tread segments radially adjustable thereon and including overlapping segments for varying the length of the normal tread circumference.

6. A collapsible tire-building core comprising a core body of adjustable width transversely divided into segments, and a series of tread segments including some which overlap and some which abut at their ends, said tread segments being radially adjustable on the core body for increasing and diminishing the length of the tread circumference coordinately with the increase and decrease in the width of the core.

7. A tire-building core comprising a core body of toric shape longitudinally divided into sections which are relatively adjustable transversely to vary the width of the core body, and a series of trough-shaped tread segments transversely conforming to the contour of the core body at its narrowest adjustment and radially adjustable on said core body to vary the normal length of the tread circumference coordinately with the variation of width of said core body.

8. A tire-building core comprising a core body adjustable as to width, and means operated by varying the width of said core body for also varying the length of its tread circumference.

9. A tire-building core comprising a toric core body longitudinally divided into relatively adjustable sections for varying the width of said body, and a series of transversely arcuate tread segments radially adjustable on said core body by action of the body sections on the edges of said segments for varying the length of the tread circumference.

10. A tire-building core having a body of adjustable width, and radially adjustable external means on said body for maintaining a tread surface which is substantially continuous with that of the core body both laterally and circumferentially throughout the circumference in the different width adjustments of the body.

11. A tire-building core comprising a body adjustable as to width, and an external, circumferentially continuous tread structure of adjustable length thereon composed of trough-shaped segments having inwardly-extending stems connecting them with the core body.

12. A tire-building core comprising a transversely convex body of adjustable width, and a tread structure thereon including a transversely-curved, concavo-convex, sheet-metal plate inwardly conformable to the convex core body and a stem connecting said plate with the core body and radially adjustable on the latter.

13. A tire-building core comprising a toric body adjustable as to width and transversely divided into segments for collapsing the core, and a tread structure adjustable on said body to vary the length of the tread circumference and including a plurality of segments on certain of the body segments.

14. A longitudinally-arcuate core-body segment of adjustable width having end faces in divergent planes for mating with neighboring core segments, and a tread structure on said segment including a pair of tread segments whose respective outer ends are adjustable substantially in the planes of the end faces of said body segment.

15. A longitudinally-arcuate core-body segment of adjustable width, and a radially-adjustable tread structure thereon composed of overlapping segments including a pair of relatively long end segments and a relatively short middle segment.

16. A collapsible tire-building core of adjustable width transversely divided into segments including a radially-slidable key segment and other body segments collectively forming therewith a complete annulus, and a radially-adjustable tread structure on said core substantially continuous circumferentially thereof at all adjustments, said structure including a tread segment on the key segment and a plurality of overlapping tread segments on each of the other body segments whose ends lie in divergent planes.

17. A tire-building core of adjustable width transversely divided into body segments, and a radially-adjustable tread structure thereon including tread plates on each of the body segments each provided with one or more adjustable bolts for positively securing them at the different adjustments to their respective body segments.

18. A tire-building core comprising a core body of toric shape and adjustable width, a tread structure thereon radially adjustable by variations in the width of the core body, and yielding connections for holding said structure against the core body.

In witness whereof I have hereunto set my hand this 18th day of August, 1931.

HENRY C. BOSTWICK.